United States Patent [19]

Lichowsky

[11] 3,908,460

[45] Sept. 30, 1975

[54] PRESSURE TRANSDUCER

[75] Inventor: Abraham Lichowsky, Los Angeles, Calif.

[73] Assignee: Ambitex Corporation and Cendev Corporation, Ambitex Company, Santa Monica, Calif.

[22] Filed: Feb. 28, 1974

[21] Appl. No.: 446,755

[52] U.S. Cl. .............................. 73/398 R; 73/410
[51] Int. Cl.[2] .......................................... G01L 9/00
[58] Field of Search .......... 73/398 R, 398 AR, 410; 250/231 R, 231 P, 386; 338/42, 4

[56] References Cited
UNITED STATES PATENTS

| | | | |
|---|---|---|---|
| 3,455,166 | 7/1969 | Gineste | 73/398 R |
| 3,739,645 | 4/1971 | Gorgens et al. | 73/410 |

Primary Examiner—Donald O. Woodiel
Attorney, Agent, or Firm—Ralph B. Pastoriza

[57] ABSTRACT

Minute movement of a bellows from a quiescent position as a result of pressure in the bellows is detected by a photodetector and light source to generate a signal constituting a function of the position of the bellows. This signal is amplified and fed back to a coil with a cooperative magnetic core to generate electromagnetically a force opposing the movement of the bellows. The greater the movement, the greater is the opposing force so that the bellows reaches an equilibrium position very close to its quiescent position. By then measuring the value of the signal, an extremely accurate measurement of the opposing force and thus the balancing pressure in the bellows is attained.

6 Claims, 3 Drawing Figures

U.S. Patent  Sept. 30,1975  3,908,460
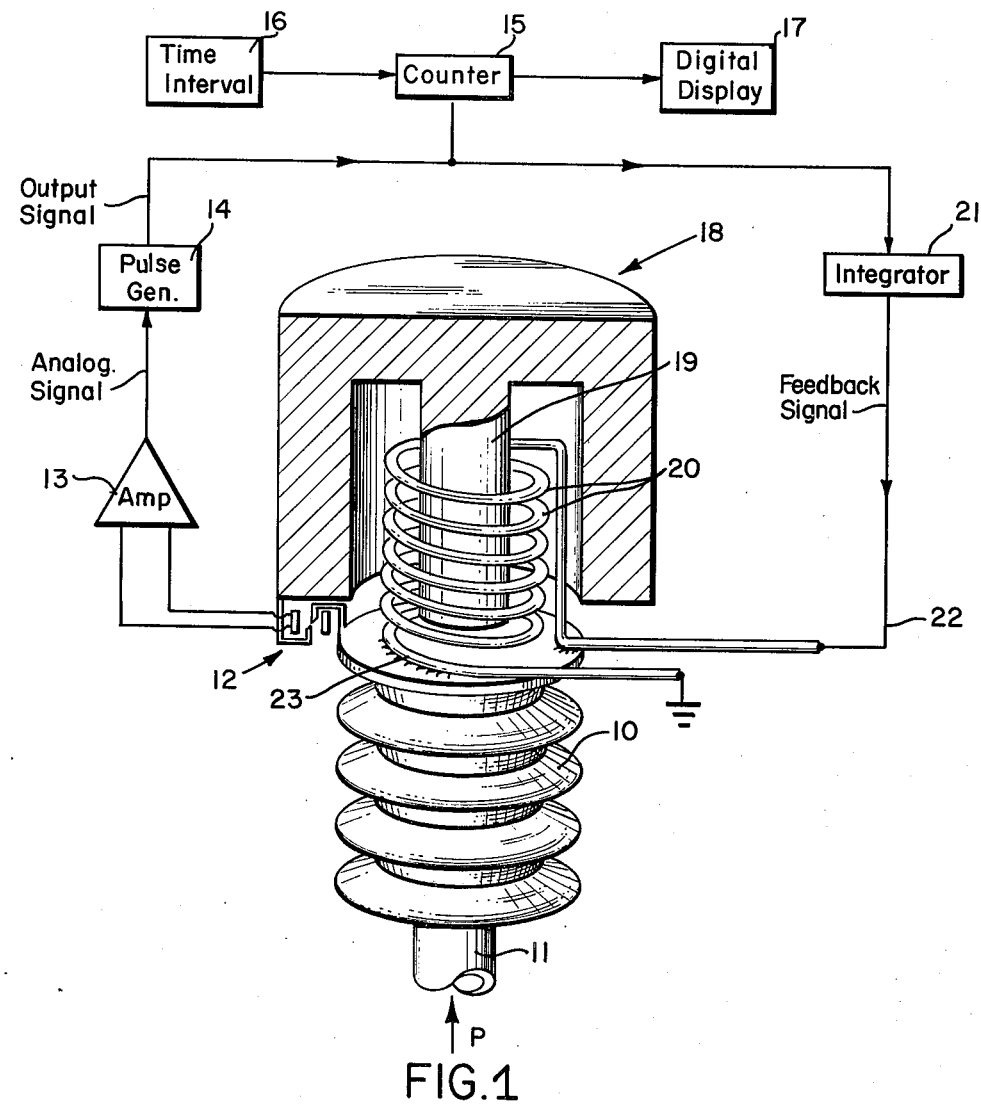
FIG.1
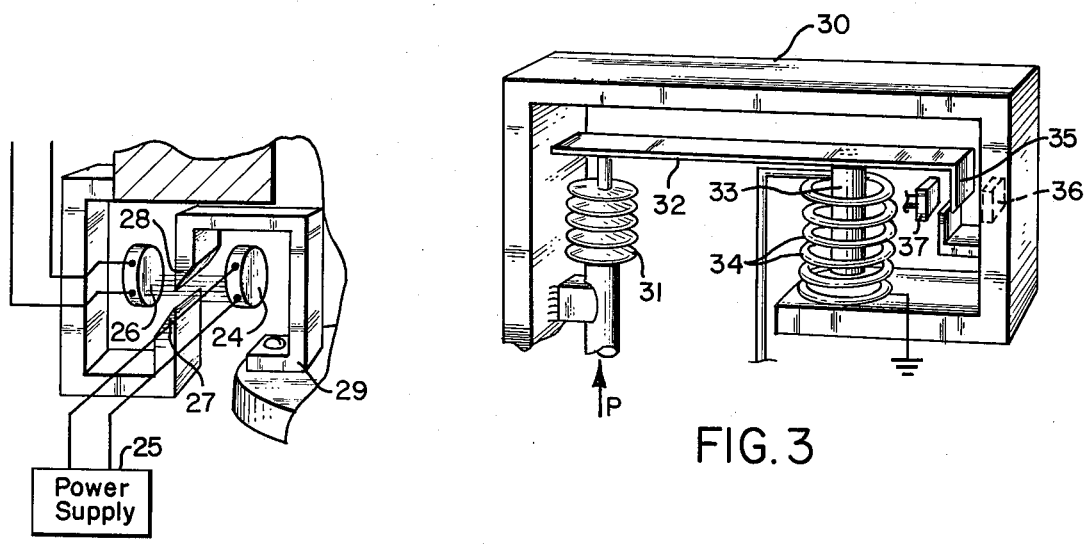
FIG.2
FIG.3

PRESSURE TRANSDUCER

This invention relates to pressure transducers and more particularly to transducers converting a pressure into an electrical signal to provide an indication of pressure.

BACKGROUND OF THE INVENTION

Pressure transducers or devices for converting pressures into electrical signals constituting a function of the pressure are well known in the art. Generally, these devices operate on the principle of a bellows or other mechanically movable member which is responsive to a pressure to be measured to assume various positions in accord with the pressure. A suitable transducer converts this movement into an electrical signal which may then be calibrated to provide a pressure reading.

Utilizing the movement of a bellows or equivalent structure for measuring pressure can introduce inaccuracies unless there is great care involved in designing the particular movable element. If there is any type of elastic restoring force, the elastic constant must remain consistent over the life of the instrument if consistent and accurate results are to be realized. If the pressure to be measured varies over a large range, there is necessarily involved a relatively large degree of movement to be transduced into an electrical signal. The greater such movement, the greater the likelihood of introducing non-linearities and thus again, accuracy is impaired.

The net result of the foregoing is the practical problem that really accurate pressure transducers are quite expensive to manufacture and thus constitute a costly component of any system utilizing the transducer. It would be very desirable if a pressure transducer could be designed which provided the degree of accuracy demanded in many applications and yet which could be manufactured relatively inexpensively.

BRIEF DESCRIPTION OF THE PRESENT INVENTION

With the above in mind, the present invention contemplates an improved pressure transducer wherein a physical movement is converted to an electrical signal to provide a pressure indication but wherein the various component parts are relatively simple and inexpensive and yet consistency and high accuracy throughout the life of the instrument are attained.

Essentially, the pressure transducer of the present invention includes movable means responsive to a pressure to be measured, the movable means assuming slightly different positions from a quiescent position for different pressures. An electrical signal generating means in turn is connected to the movable means for generating a signal constituting a function of the position of the movable means. This signal is amplified and used to energize electro-magnetic means to generate an opposing force to the movable means, the greater the movement the greater the opposing force so that an equilibrium position is reached by the movable means very close to its quiescent position. Since the opposing force balances the pressure to be measured, the value of the amplified signal generating this force provides a measurement of the pressure. Moreover, there is required only a negligible movement of the movable member to cover large pressure variations so that by measuring the signal at the time an equilibrium position is reached, an extremely accurate indication of the pressure is provided.

BRIEF DESCRIPTION OF THE DRAWINGS

A better understanding of the invention will be had by now referring to the accompanying drawings in which:

FIG. 1 is a perspective view partly cut away together with a block diagram showing the basic components of a first embodiment of the pressure transducer of this invention;

FIG. 2 is an enlarged fragmentary view of a portion of the structure of FIG. 1; and FIG. 3 is a fragmentary perspective view of a modified embodiment of the invention.

DETAILED DESCRIPTION OF THE INVENTION

Referring first to FIG. 1, there is shown a movable means in the form of a bellows 10 connected to a tube 11 subject to a pressure P to be measured. The arrangement is such that the bellows 10 can move up and down with increasing and decreasing pressures P so that it could assume different positions for different pressures.

As indicated generally by the numeral 12, there is provided an analog signal generating means responsive to minute movements of the bellows for generating an analog signal constituting a function of the position of the bellows. The portion 12 of this analog signal generating means will be described in detail subsequently. The initial signal derived from the structure 12 passes through an amplifier 13 to provide a large analog signal in response to very small movements of the bellows. This signal is then passed into a pulse generator 14 which may include a voltage controlled oscillator from which an output series of pulses of constant amplitude and pulse width having a frequency constituting a function of the analog signal is provided. A counter means including a counter 15, time interval generating means 16, and digital display 17 is connected to receive the output signal from the pulse generator 14 as shown.

In accord with an essential feature of the present invention, there is provided an electro-magnetic means designated generally by the numeral 18 including a core 19 of magnetic material and an electrical coil 20 surrounding the core. A feedback means including an integrator 21 and line 22 passes a feedback signal derived from the original analog signal to the electrical coil 20. Essentially, the integrator 21 integrates the pulses to provide an analog feedback signal corresponding to the analog signal from amplifier 13.

With the foregoing arrangement, the coil 20 is wound such that the signal received therein will generate an electro-magnetic force opposing the movement of the bellows 10. Thus, in FIG. 1 it will be noted that the coil 20 is affixed as at 23 to the bellows 10 so that force applied through the coil 20 will tend to move the bellows in a direction opposing its initial movement. The presence of an electrical current in the coil as provided by the feedback accordingly generates an electro-magnetic opposing force balanced against the pressure in the bellows so that an equilibrium position will be reached almost precisely at the quiescent position of the bellows.

The foregoing will become clearer when the overall operation is described.

Referring now to FIG. 2, there is shown the analog signal generating means 12 for providing an analog signal constituting a function of the position of the bellows 10. In the particular embodiment illustrated, this signal generating means includes a light source 24 which may be powered by the power supply 25 to pass a light beam to a photo-detector cell 26. The output leads from the photo-detector cell 26 pass to the amplifier 13 of FIG. 1.

As shown, there is provided a shutter means including a fixed shutter 27 and a movable shutter 28 secured to the bellows as at 29 for movement with the bellows. The arrangement of the shutters is such that maximum light is transmitted through a very narrow slit between the shutters so as to eclipse large portions of the light to a degree depending upon slight variations in the position of the bellows. It will thus be evident that the output signal from the photo-detector cell 26 will constitute a function of the position of the bellows, the transducing of the physical movement into an electrical signal being accomplished without any mechanical interference with such movement.

OPERATION OF THE EMBODIMENT IN FIG. 1

In operation, assume that there is a given pressure P in the bellows 10 so that it is in a stationary quiescent position. The corresponding position of the shutter portion in the analog signal generating means will give rise to a given signal which is amplified in the amplifier 13 and converted to a series of pulses by the pulse generator 14. The frequency of these pulses is counted by the counter 15 over a constant time interval provided by the time interval generating means 16. The total count during the time interval may be displayed by the digital display 17 and calibrated into units of pressure. There is thus provided a visual display of the particular pressure P. It will be understood that the bellows is urged under the pressure P to move upwardly in opposition to the force generated by the coil 20. The feedback signal to the coil is thus always in a direction to generate a force tending to move the bellows downwardly; that is, a balancing force against the pressure P. Under the given pressure P, as described, balanced by the force generated by the coil, the bellows is defined herein as being in a quiescent position, that is, a steady state position.

Assume now that the pressure increases. In this event, the bellows 10 will tend to move upwardly as viewed in FIG. 1 and the shutter component 24 of the analog signal generating means 12 will tend similarly to move upwardly permitting more light to strike the photo-detector cell as described in FIG. 2. An increased analog signal will then be amplified by the amplifier 13 and result in an increase in the frequency of the series of pulses from the pulse generator 14. The increased frequency signal is monitored by the counter 15 and a new digital display is provided indicating the increased pressure. Further, this same increased output signal will pass through the integrator 21 and line 22 to the electrical coil 20 giving rise to an increased electromagnetic force opposing the increased pressure. It will be appreciated that the greater the upward movement as a consequence of increased pressure, the greater will be the analog signal and thus the greater will be the feedback signal to the electrical coil 20 since this feedback signal is derived from the analog signal. Therefore, there will be a greater electro-magnetic force tending to urge the bellows 10 downwardly as a consequence of the affixing of the coil to the bellows.

An equilibrium position for the bellows will thus rapidly be reached which is very close to its quiescent position and the frequency of the output signal when equilibrium is reached will accurately reflect the increased pressure P.

In the event the pressure P should decrease thereby permitting the bellows 10 to move downwardly, lesser light will be eclipsed giving rise to a decrease in the analog signal which will result in a decreased frequency of the pulses passed to the counter 15. This decreased frequency signal is also integrated in the integrator 21 and applied to the electrical coil 20 to provide a lesser opposing force to balance the lesser pressure so that again an equilibrium position is attained and the new frequency output signal then measured to provide the new pressure reading on the digital display.

The foregoing described feedback principle enables a very inexpensive pressure transducer to be manufactured and yet provide consistent and extremely accurate pressure measurements. The reason for the improved results resides in the fact that very minute physical movement of the bellows or movable means actually takes place because of the balancing electromagnetic force provided by the coil and core structure described. Thus, large pressure ranges can be measured without the disadvantage of large physical movement taking place. Moreover, the electro-magnetic structure itself can be economically produced. For example, a conventional loudspeaker voice coil and associated permanent magnet could be used with excellent results.

Referring now to FIG. 3 there is shown a modified embodiment wherein the movement of the bellows in response to changing pressures can be further minimized. Thus, in FIG. 3 there is shown a frame structure 30 supporting a bellows structure 31 subject to a pressure P to be measured. The upper portion of the bellows which is movable connects to a lever 32 adjacent to one end portion hinged as by a flexure pivot to the frame 30 as shown. The other far end of this lever in turn connects to a core 33 of an electro-magnetic means including an electrical coil 34 surrounding the core and fixed to the frame as shown.

As in the case of the embodiment of FIG. 1, motion of the bellows is transduced into an electrical analog signal by a suitable shutter arrangement such as indicated at 35 on the end of the lever 32 arranged to eclipse in degrees light from a source 36 falling onto a photo-detector cell 37. In the embodiment of FIG. 3, the core 33 is connected to the movable member in the form of the bellows 31 through the lever 32 and the electrical coil 34 is stationary. Otherwise, the various remaining electrical components described in FIG. 1 are identical, a feedback signal being passed to the coil 34 in such a manner as to give rise to a force opposing movement of the lever.

It will be appreciated in the embodiment of FIG. 3, that movement of the bellows 31 is mechanically amplified by means of the lever 32 so that the core 33 will exaggerate the bellows movement. Further, the feedback signal applied to the coil to generate an opposing electro-magnetic force will result in a mechanically-amplified opposing force on the bellows 31 through the same lever 32. The final result is that the equilibrium positions of the bellows all fall within a very small range over a wide range of pressures, the only difference being in the value of the electrical signal which provides the desired pressure indication as described in FIG. 1.

From the foregoing description, it will thus be seen that the present invention has provided a greatly improved pressure transducer wherein extremely accurate pressure indications are provided without the necessity of expensive and sophisticated components. When only minute movements of the bellows or any movable member are involved, problems of changes in the elastic constant, mechanical hysteresis and difficult repeatability are all substantially eliminated.

While the particular embodiment disclosed illustrates a digital display, an indication of the analog signal could be directly displayed. Moreover, this analog signal could be directly fed back to the coil rather than digitized and then reintegrated. However, by using the digital technique described, the measuring technique is isolated from affecting the feedback signal.

It should also be appreciated that by using high gain in the feedback loop, the movement of the bellows is further reduced. However, the loop gain is limited by the stability requirements and the rate of pressure fluctuations, so that only when measuring relatively slowly varying pressures will very high gain be advantageous.

What is claimed is:

1. A pressure transducer comprising, in combination:
   a. movable means responsive to a pressure to be measured, said movable means being capable of assuming different positions for different pressures;
   b. analog signal generating means responsive to said movable means for generating an analog signal constituting a function of the position of said movable means;
   c. pulse generating means including a voltage controlled oscillator connected to said analog signal generating means to receive said analog signal and provide an output series of pulses of frequency constituting a function of said analog signal;
   d. counter means including a counter connected to receive said series of pulses; time interval generating means connected to said counter to actuate the counter for a given time interval; and a digital display connected to the counter to provide a digital reading corresponding to the number of counts counted by said counter during said given time interval to thereby provide an indication of the frequency thereof;
   e. electro-magnetic means connected to said movable means; and
   f. feedback means including an integrator receiving said series of pulses and providing a feedback signal to said electro-magnetic means derived from said analog signal to generate an electro-magnetic force opposing the direction of movement of said movable means whereby an equilibrium position is reached by said movable means, the frequency of said series of pulses constituting a function of the pressure opposing said electro-magnetic force when equilibrium is reached so that a pressure reading may be provided by properly calibrating the indicated frequency in terms of pressure.

2. A pressure transducer according to claim 1, in which said analog signal generating means comprises a light source and photo-detector cell in alignment to receive light from said source; shutter means secured to said movable means for movement therewith such that the shutter eclipses the light to a degree determined by its position; and amplifier means connected to said photo-detector cell to amplify the signal therefrom to provide said analog signal.

3. A pressure transducer according to claim 1, in which said movable means comprises a pressure bellows and said electro-magnetic means includes an electrical coil surrounding a core of magnetic material, said electrical coil being connected to receive said feedback signal.

4. A pressure transducer according to claim 3, in which said core is stationary and said coil is affixed to said bellows.

5. A pressure transducer according to claim 3, in which said electrical coil is stationary and said core is coupled to said bellows for movement thereby.

6. A pressure transducer according to claim 5, in which there is provided a lever member coupling the core to the bellows so that movement of the core in response to movement of the bellows is mechanically amplified by said lever member.

* * * * *